US009512023B1

(12) United States Patent
Culler

(10) Patent No.: US 9,512,023 B1
(45) Date of Patent: *Dec. 6, 2016

(54) WASTEWATER TREATMENT SYSTEM AND METHOD

(71) Applicant: Eco Wastewater Concentrator, LLC, Fort Lauderdale, FL (US)

(72) Inventor: Paul L. Culler, Tequesta, FL (US)

(73) Assignee: Eco Wastewater Concentrator, LLC, Fort Lauderdale, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 15/276,773

(22) Filed: Sep. 26, 2016

Related U.S. Application Data

(63) Continuation of application No. 15/018,863, filed on Feb. 8, 2016.

(51) Int. Cl.
   C02F 1/38   (2006.01)
   C02F 9/00   (2006.01)
   C02F 1/44   (2006.01)

(52) U.S. Cl.
   CPC . *C02F 9/00* (2013.01); *C02F 1/44* (2013.01); *C02F 2201/007* (2013.01);
   (Continued)

(58) Field of Classification Search
   CPC ...... B04C 3/06; B04C 2003/006; B04C 5/103; B04C 5/107; B04C 5/12; B04C 5/13; B04C 9/00; B04C 2009/007; B04B 5/10; B04B 5/12; F04D 3/02; F04D 1/04; F04D 29/181; F04D 29/406; C02F 1/008; C02F 1/38; C02F 1/44; C02F 1/40; C02F 9/00; C02F 11/12; C02F 11/121; C02F 11/122; C02F 11/123; C02F 11/125; C02F 11/126; C02F 11/127; C02F 2101/30; C02F 2103/002; C02F 2103/003; C02F 2103/005; C02F 2103/42; C02F 2209/003; C02F 2209/005; C02F 2209/006; C02F 2209/10; C02F 2209/40; C02F 2001/007; B01D 21/26; B01D 21/262; B01D 21/267; B01D 21/0018; B01D 17/0217
   See application file for complete search history.

(56) References Cited

U.S. PATENT DOCUMENTS 3,493,120 A   2/1970 Milner
4,478,712 A   10/1984 Arnaudeau
(Continued)

FOREIGN PATENT DOCUMENTS

CN   203741187 U   7/2014
KR   101346207 B1   12/2013
WO   0100296 A1   1/2001

OTHER PUBLICATIONS

Enviro Voraxial Technology, Inc., presentation handout, Mar. 16, 2011, accessed on the Internet at https://nrm.dfg.ca.gov/FileHandler.ashx?DocumentID=29708 on Nov. 15, 2015.
(Continued)

*Primary Examiner* — David C Mellon
(74) *Attorney, Agent, or Firm* — Stone Creek Services LLC; Alan M Flum

(57) ABSTRACT

Disclosed is a system and method for treating municipal and sanitary wastewater that uses only mechanical devices and processes, which eliminates biological processes and settling tanks. The system includes a three-output Richter-type separator that separates wastewater into three fluid streams according to the specific gravity of the solids within the fluid streams. The lighter-than-water and heavier-than-water solids streams are combined and the resultant sludge is mechanically dewatered without intermediary biological-process systems or sedimentation. The partially clarified water component can be directly filtered by a membrane filter and optionally optically or chemically disinfected for reuse or disposal. The system advantageously simplifies municipal and sanitary wastewater treatment eliminating traditional primary and secondary treatment stages, and significantly reducing the system's operational footprint. The system and method can be scaled to very large municipal systems.

21 Claims, 10 Drawing Sheets

(52) U.S. Cl.
CPC .... *C02F 2209/006* (2013.01); *C02F 2209/03* (2013.01); *C02F 2209/10* (2013.01)

(56) References Cited

U.S. PATENT DOCUMENTS

| | | | |
|---|---|---|---|
| 4,834,887 | A | 5/1989 | Broughton |
| 4,956,926 | A | 9/1990 | Glorioso |
| 5,062,955 | A | 11/1991 | Sciamanna |
| 5,084,189 | A | 1/1992 | Richter |
| 5,837,142 | A | 11/1998 | Mullerheim et al. |
| 5,904,840 | A | 5/1999 | DiBella |
| 6,248,231 | B1 | 6/2001 | Di Bella et al. |
| 6,488,853 | B1 | 12/2002 | Mullerheim |
| 7,169,305 | B2 | 1/2007 | Gomez |
| 7,727,386 | B2 | 6/2010 | DiBella et al. |
| 8,062,522 | B1 | 11/2011 | Culler |
| 8,066,887 | B1 | 11/2011 | Culler |
| 8,092,692 | B2 | 1/2012 | Nilsen et al. |
| 8,101,078 | B1 | 1/2012 | Culler |
| 8,142,656 | B1 | 3/2012 | Culler |
| 8,425,782 | B2 | 4/2013 | Culler |
| 8,852,323 | B2 | 10/2014 | Schook |
| 2005/0109684 | A1 | 5/2005 | DiBella et al. |
| 2009/0176638 | A1 | 7/2009 | Bella |
| 2011/0147306 | A1 | 6/2011 | Polizzotti et al. |
| 2011/0297597 | A1 | 12/2011 | Di Bella et al. |
| 2012/0145633 | A1 | 6/2012 | Polizzotti et al. |
| 2015/0299006 | A1 | 10/2015 | Kincaid et al. |

OTHER PUBLICATIONS

Enviro Voraxial Grit Separator Hillsborough County Demonstration Project Report PO No. DPWA03728202, Sep. 2004, Enviro Voraxial Technology, Ft. Lauderdale, FL.

Wastewater treatment solid liquid cyclone separator high speed centrifuge, Chengdu Wes Petroleum Equipment Co., Ltd., accessed on the Internet at: http://www.alibaba.com/product- gs/655735867/wastewater_treatment_solid_liquid_cyclone_separator. html on Nov. 16, 2012.

Animal manue solid liquid separator with best quality, Zhengzhou Mahaco Trading Co., Ltd., China, accessed on the Internet at: http://www.alibaba.com/product- gs/605253719/Animal_manure_solid_liquid_separator_with.html on Nov. 20, 2012.

Introducing GEA Westfailia Separator ecoforce, Nov. 5, 2012, GEA Mechanical Equipment US, Inc. Northvale, NJ.

Case Study Naval Facilities Engineering Command Point Mugu, CA Storm/Waste Water Treatment, Feb. 11, 2013, Enviro Voraxial Technology, Ft Lauderdale, FL. Accessed on the Internet at http://www.evtn.com/case_studies/Case_Study_Naval_Facilities_Pt_M ugu.pdf on Nov. 17, 2015.

EVTN Announces Voraxial Order for Produced Water Treatment, Mar. 15, 2015, Enviro Voraxial Technology, Inc., Fort Lauderdale, FL. (Note: that this is a press release of the Assignee and Inventor's test use of the voraxial separator).

George Tchobanoglous, The Evolution of Wastewater Treatment, H2O New York City Water Summit, Apr. 9, 2010, p. 30, New York, NY.

Andreas Hauser, Technology Options for Sustainable Wastewater Solutions, Sub-regional Conference on Wastewater Management, Jan. 30, 2013, p. 8, Asian Development Bank, Manila, Philippines.

Lynn Fossee, Addressing One of the Largest Markets Sectors in the World with their Voraxial Separator, Enviro Voraxial Technology, Inc. is Helping their Oil and Gas, Food Procesing, Mining and Deredging Customers Reduce Costs in Spearating Contaminants from Large Volumes of Liquids, CEOCFO Magazine, Sep. 24, 2012, Palm Harbor, FL.

Voraxial Separator by EVTN (cutsheet), Jun. 27, 2013, accessed on the Internet at http://www.evtn.com/pdf_publications/Voraxial_Separators_Overview_FINAL.pdf on Nov. 15, 2015.

Dann Samela, John Di Bella, Voraxial Separator for Separation of Oil and Solids from Produced Water, 20th Annual Produced Water Society Meeting, Houston TX, Jan. 2010, Downloaded from the Internet at: http://www.evtn.com/pdf_publications/EVTN_Produced_Water_Society_Houston_2010_main_blue3.pdf on Jan. 17, 2016.

EVTN Three Phase Separator, Sep. 2015, Auxill Netherland, Netherlands, downloaded from the Internet at www.auxill.nl/en/download/Auxill%2520EVTN%2520UK%252015.pdf on Jan. 17, 2016.

Case Study Voraxial 2000 Separator Deck Drainage System, Feb. 11, 2013, Enviro Voraxial Technology, Ft. Lauderdale, FL US, downloaded from the Internet at http://www.evtn.com/case_studies/Voraxial_2000_Deck_Drainage_System.pdf.

B.C. Punmia and Ashok Jain, Wastewater Engineering (Second Edition), Jul. 1998, pp. 348-349, Laxmi Publications, New Delhi, India.

Primer for Municipal Wastewater Treatment Systems, EPA 832-R-04-001, Sep. 2004, pp. 8-22, Office of Wastewater Management, United States Environmental Protection Agency, Washington, DC, US.

R. Bazzaoui, L. Franikin, S. Groslambert, T. Salmon, M. Crine, A. Leonard, Impact of Sludge conditioning on Mechanical Dewatering and Convective Drying, Sep. 26, 2011, European Dry Conference, Palma, Balearic Island, Spain.

Jean Pierre Deltreil, Mechanical Dewatering Using Filter Press Technology, Nov. 4, 2003, Faure Equipements, Limoges, France.

Biosolids Technology Fact Sheet, Centrifuge Thickening and Dewatering, EPA 832-F-00-053, Sep. 2000, Office of Water, United States Environmental Protection Agency, Washington, D.C. US.

Grit King All Hydraulic Grit Separation, Product Cutsheet, Feb. 5, 2015, Hydro International, Hillsboro, Oregon, US, downloaded from the Internet at http://www.hydro-int.com/UserFiles/downloads/Grit%20King.pdf on Feb. 7, 2016.

National Manual of Good Practice for Biosolids, National Biosolids Partnership,Jan. 2005, chapters 3-5, Water Environment Federation, Alexandra, VA US.

Paul L Culler, Wastewater Separator, U.S. Appl. No. 15/018,825, filed Feb. 8, 2016, United States Patent and Trademark Office, Alexandria, VA US.

James P. Elliot, Preliminary Engineering Report Eco Wastewater Concentrator (EWC) Demonstration Project Proof of Concept—Phase I, Apr. 2015, Eco Wastewater Concentrator Inc., Fort Lauderdale, FL US.

David C. Mellon, Ex Parte Quayle Action for U.S. Appl. No. 15/018,863, "Wastewater Treatment System and Method," Inventor: Paul L. Culler, Action Mailing Date: Aug. 2, 2016, United States Patent and Trademark Office, Alexandria, VA United States.

David C. Mellon, Notice of Allowance for U.S. Appl. No. 15/018,863, "Wastewater Treatment System and Method," Inventor: Paul L. Culler, Action Mailing Date: Aug. 16, 2016, United States Patent and Trademark Office, Alexandria, VA United States.

WASTEWATER TREATMENT SYSTEM AND METHOD

CROSS REFERENCE

This application is a continuation of U.S. patent application Ser. No. 15/018,863 filed on Feb. 8, 2016. The entire contents of U.S. patent application Ser. No. 15/018,863 are hereby incorporated by reference.

FIELD OF INVENTION

The present disclosure relates to a system and method for treating sanitary and municipal wastewater using centrifugal separation.

BACKGROUND

Municipal wastewater generally is piped from homes and businesses through a sewer piping system to a municipal wastewater treatment plant. In many towns and cities, storm water runoff infiltrates the sewer piping system. Municipal wastewater typically includes human urine and feces, food waste, household chemicals, and paper products such as toilet paper, tampons, and sanitary napkins. When mixed with storm water runoff, municipal wastewater can also include other litter and debris.

One of the purposes of treating municipal and sanitary wastewater is to allow sewage to be disposed without danger to human health or damage to the environment. Municipal wastewater is typically composed of approximately 99.8% to 99.9% water. The other 0.1% to 0.2% of municipal wastewater includes contaminants such as grit, fats and oils, oxygen-demanding substances, pathogens, plant nutrients, inorganic chemicals, and synthetic organic chemicals. One of the basic strategies of municipal and sanitary wastewater treatment is to remove or neutralize these contaminants and either dispose or reuse the water.

A typical municipal wastewater treatment process includes the following stages: pre-treatment, primary treatment, secondary treatment, tertiary treatment, and sludge treatment. The purpose of primary, secondary, and tertiary treatment is to remove and neutralize solids and pathogens so that the remaining water can be either reused or disposed of safely into the environment. The removed solids are known as sludge. The purpose of sludge treatment is to sufficiently dewater the sludge and neutralize the pathogens in the sludge so that the dewatered sludge can be safely recycled or disposed of.

Pre-treatment removes gross particulates and grit that can interfere with primary and secondary treatment processes. Primary treatment, also known as primary sedimentation, typically uses gravity to remove heavier-than-water solids, typically, in a basin or tank. The heavier-than-water solids settle to the bottom of the tank and are scraped and drained. The floating debris is skimmed from the top, passing over a weir. These solids are known as primary sludge.

Secondary treatment removes additional suspended solids and dissolved biodegradable material. This is typically accomplished using aerobic, or oxygen consuming, microorganisms to consume the soluble organic contaminants and other biodegradable material.

Tertiary treatment takes the product water from the secondary treatment and prepares it for reuse or for release into the environment. Tertiary treatment can remove remaining biological oxygen demand (BOD) dissolved solids, metals, pharmaceuticals, pesticides, and endocrine disruptors. There are a number of possible strategies for tertiary treatment. These can include media filtration, membrane filtration, ammonia and phosphate removal, and chemical disinfection.

The sludge can be biologically processed by either aerobic or anaerobic bacteria. The thickened sludge resulting from this operation typically has a solids concentration of 0.5% to 1% of solids to water. This sludge is further dewatered typically using a sludge filter press or a sludge-dewatering centrifuge. Both sludge filter presses and sludge-dewatering centrifuges require a minimum of 0.5% to 1% solids to water concentration for proper operation. The output of the dewatering process has approximately 15% to 35% solids to water concentration and typically is heat sterilized before disposal.

SUMMARY

As late as Feb. 25, 2015, the inventor utilized a three-output Richter-type separator in a municipal wastewater treatment for experimental testing at the Palm Beach County Western Region Wastewater Treatment Plant in Pahokee, Fla. As used in throughout this disclosure, a Richter-type separator is defined as an axial-flow type separator for separating immiscible fluids, or for separating solids in a fluid carrier, having different specific gravities and including a discharge manifold body connected to the fluid pump for drawing solids components having heavier specific gravities, where fluid pump employs an impeller having a hollow core for passing fluid from an inlet, the impeller having a decreasing axial pitch in the direction of fluid flow. U.S. Pat. No. 5,084,189 by inventor Harvey E. Richter exemplifies a Richter-type separator. The entire contents of U.S. Pat. No. 5,084,189 are herein incorporated by reference.

As used throughout this disclosure, a three-output Richter-type separator is defined as a Richter-type separator that separates solids in a water carrier into at least three components according to specific gravity. Examples of three-output Richter-type separators can be found in U.S. Patent Application No. 2012/0145633 and U.S. 2011/0147306 both to Polizzotti et al. Three-output Richter-type separators have primarily been used to separate oil from water and from heavier-than-water components such as sand or grit. Typical applications of the three-output Richter-type separators include oil spill cleanup, oil extraction, and oil/petroleum processing operations. To our knowledge, the inventor's experimental use at the Palm Beach County Western Region Wastewater Treatment Plant is the first actual use of a three-output Richter-type separator for separating lighter-than-water and heavier-than-water specific gravity solids from sanitary or municipal wastewater and in a municipal wastewater treatment plant.

During testing of the three-output Richter-type separator, the Inventor recognized unexpectedly, that he could combine the lighter-than-water and heavier-than-water specific gravity solids components of sanitary or municipal wastewater and gain sufficient solids concentration to feed the combination to a sludge de-watering device without any intermediary biological and sedimentation process. In addition, since the product water was sufficiently clear of solids that it could be feed directly to a membrane separator.

DRAWINGS

DETAILED DESCRIPTION

Figure 1:
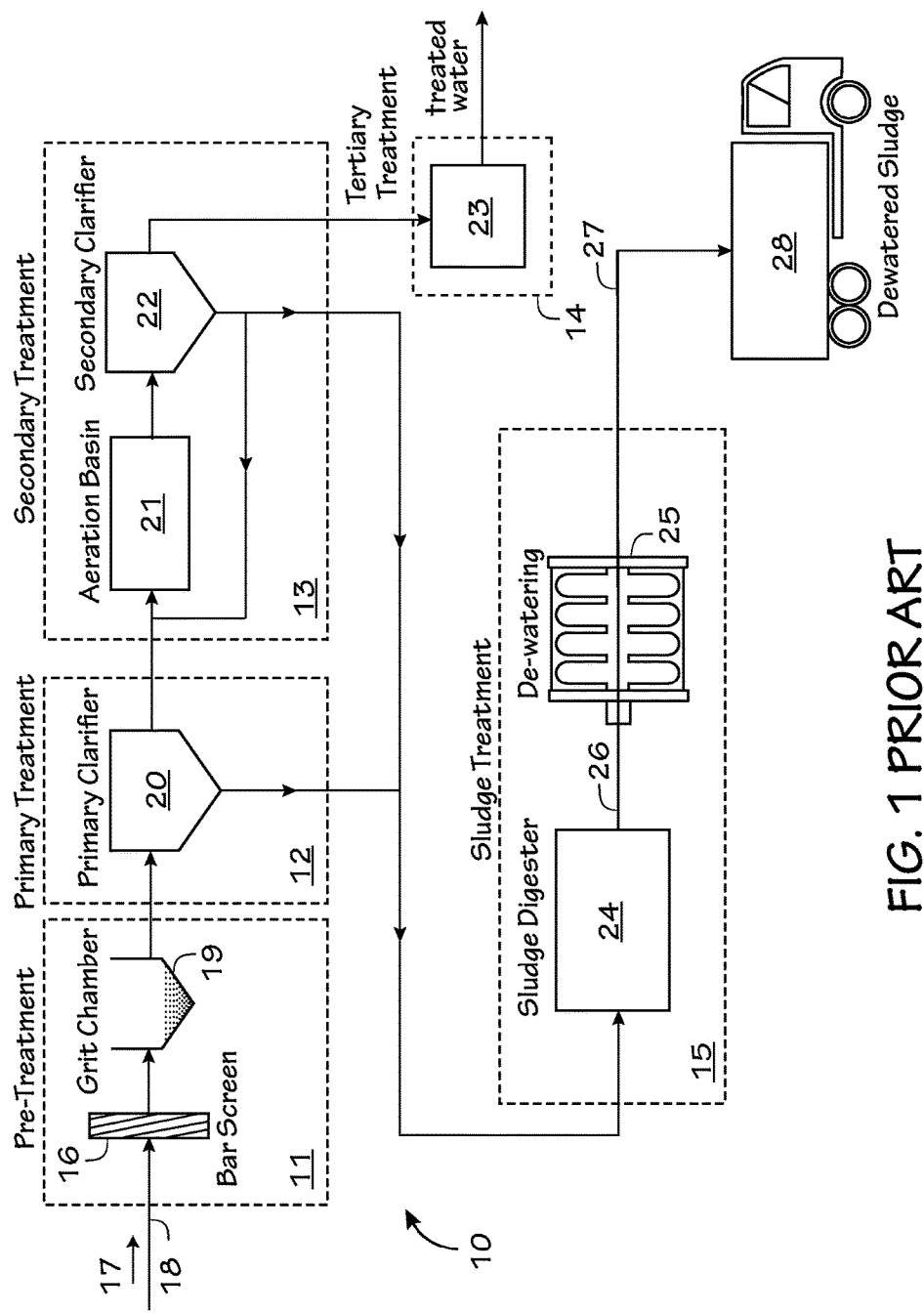
FIG. 1 illustrates a block diagram of a conventional municipal wastewater treatment system typical in the prior art.

The following terms are used throughout this disclosure and are defined here for clarity and convenience.

Axial-flow type separator: as used throughout this disclosure, an axial-flow type separator is a defined as a centrifugal separation device for separating immiscible fluids, or solids in a fluid carrier, of different specific gravities by utilizing an axial-flow pump. An axial-flow pump is a centrifugal pump that uses an impeller that directs the flow of fluid axially rather than radially.

Municipal wastewater: as used throughout this disclosure, municipal wastewater is defined as disposed water from communities, such as cities or towns that flows through a sewage piping system and is treated at a municipal wastewater treatment plant. Municipal wastewater generally includes human feces, urine, hair, fibers, as well as food waste products. Municipal wastewater can include both domestic sewage, i.e. sewage from houses and apartments and spent water from commercial operations that are disposes of into the municipal sewage piping system. Municipal wastewater may also include storm water runoff that infiltrates into the sewage piping system.

Sanitary Wastewater: as used throughout this disclosure, sanitary wastewater, or sanitary sewage, is wastewater that includes biologically active solids such as human feces or food waste products.

Mechanical Sludge Dewatering: as used throughout this disclosure, mechanical sludge dewatering refers to apparatus or methods that use a dynamic mechanical mechanism, and not a biological mechanism or sedimentation, to remove sufficient amounts of water from the sludge to form sludge cake. Examples of mechanical sludge dewatering devices include centrifuges, filter presses, belt presses, and thermal drying.

Biological-process and Biological-process system: as used throughout this disclosure, a biological-process or, a biological-process system, refers to methods or apparatus that uses either anaerobic or aerobic microorganisms to break down organic material in sanitary or municipal wastewater. Examples of biological-process-based systems include trickling filters, suspended growth process devices, aeration tanks, wastewater lagoons, constructed wetlands, and sludge digesters.

Sedimentation: as used throughout this disclosure, sedimentation refers to apparatus that uses gravity settling and surface skimming to remove suspended solids and floating solids from sanitary or municipal wastewater.

Lighter-than-water Solids Stream: as defined in this disclosure, a lighter-than-water solids stream is a resultant fluid stream from a three-output Richter-type separator that includes water as the fluid carrier and where the solids within the fluid stream are lighter-than-water.

Heavier-than-water solids stream: as defined in this disclosure, a heavier-than-water solids stream is a resultant fluid stream from a three-output Richter-type separator that includes water as the fluid carrier and where the solids within the fluid stream are heavier-than-water.

Partially clarified water stream: as defined in this disclosure, a partially clarified water stream is remaining stream that results from separating out the lighter-than-water solids and the heavier-than-water solids in a three-output Richter-type separator.

The following description is made with reference to figures, where like numerals refer to like elements throughout the several views.

FIG. 1 illustrates a block diagram of a conventional municipal wastewater treatment system 10 typical in the prior art. As discussed in the Background section of this disclosure, one of the basic strategies in municipal and sanitary wastewater treatment is to remove or neutralize the contaminants and either dispose or reuse the resulting purified water. Municipal wastewater is typically composed of approximately 99.8% to 99.9% water. The other 0.1% to 0.2% of municipal wastewater includes contaminants such as grit, fats and oils, oxygen-demanding substances, pathogens, plant nutrients, inorganic chemicals, and synthetic organic chemicals. The conventional municipal wastewater treatment system 10 of FIG. 1 is a simplified diagram representative of a typical wastewater treatment plant. The conventional municipal wastewater treatment system 10 removes or neutralizes the contaminants though a typical multi-step process: pre-treatment 11, primary treatment 12, secondary treatment 13, tertiary treatment 14, and sludge treatment 15.

Pre-treatment 11 removes gross particulates and grit that can interfere with primary treatment 12 and secondary treatment 13 processes. Sand and grit can cause excessive wear of pumps and clog aeration devices. A bar screen 16 is typically used to remove these gross particulates. The bar screen 16 is typically constructed of parallel bars of steel or iron and inclined toward the flow of the wastewater. In FIG. 1, the raw sanitary wastewater 17 enters the pre-treatment 11 stage through an inlet pipe 18 into the bar screen 16. A Grit chamber 19 removes grit, sand, coffee grounds, eggshells, and small rocks in the wastewater. Typically, the grit chamber 19 uses a vortex separator to separate grit from the wastewater. Vortex separators typical use a combination of gravity and centrifugal force. An example of an all-hydraulic vortex grit separator is sold by Hydro International under the registered trademark, GRIT KING®.

The primary treatment 12 stage typically uses gravity to remove heavier-than-water solids. This is accomplished by a process called sedimentation. In FIG. 1, this is accomplished in a primary clarifier 20 also known as a settling basin.

Secondary treatment 13 removes additional suspended solids and dissolved biodegradable material. This is typically accomplished using aerobic microorganisms to consume the soluble organic contaminants and other biodegradable material. In FIG. 1, this is accomplished using a combination of an aeration basin 21 and a secondary clarifier 22. Aeration basins are man-made ponds or basins that use artificially introduced air to promote the growth of aerobic microorganisms consume the organic matter in the wastewater. The aerated wastewater flows into the secondary clarifier 22 which is a sedimentation tank where the bio solids are removed by gravity settling.

Tertiary treatment 14 takes the product water from the secondary treatment and prepares it for reuse or for release into the environment. There are a number of possible strategies to tertiary treatment. In FIG. 1, the tertiary treatment 14 stage is a media filter 23. Media filters 23 are typically sand or carbon filter beds that can remove residual suspended solids and non-biodegradable organic compounds.

The sludge treatment 15 stage is illustrated as having two parts: a sludge digester 24 and sludge-dewatering 25. One of the goals of the sludge digester is to produce sufficient solids concentration in the sludge for the proper operation of the sludge-dewatering device. Sludge-dewatering devices typically require greater than 0.5% solids content. The sludge digester 24 uses microorganisms to digest and concentrate the solids. The thickened sludge 26 resulting from this operation typically has a solids concentration over 0.5% of solids to water.

This thickened sludge 26 is further dewatered as shown by the sludge dewatering 25 block in FIG. 1. This is typically accomplished by sludge filter press or a sludge-dewatering centrifuge. The output of the sludge dewatering 25 process, typically known as sludge cake 27, has approximately 15% to 35% solids to water concentration. The sludge cake 27 is typically hauled away 28 to be buried in a landfill or can be heat sterilized and used as fertilizer.

As late as Feb. 25, 2015, the inventor utilized a three-output Richter-type separator in a municipal wastewater treatment for experimental testing at the Palm Beach County Western Region Wastewater Treatment Plant in Pahokee, Fla. To our knowledge, the inventor's experimental use at the Palm Beach County Western Region Wastewater Treatment Plant is the first actual use of a three-output Richter-type separator for separating lighter-than-water and heavier-than-water specific gravity solids from sanitary or municipal wastewater and in a municipal wastewater treatment plant. The inventor recognized that by combining the lighter-than-water and heavier-than-water components, the output of Richter-type separator could be feed to a sludge press or sludge-dewatering centrifuge without any intermediary biological processes or sedimentation.

Figure 2:
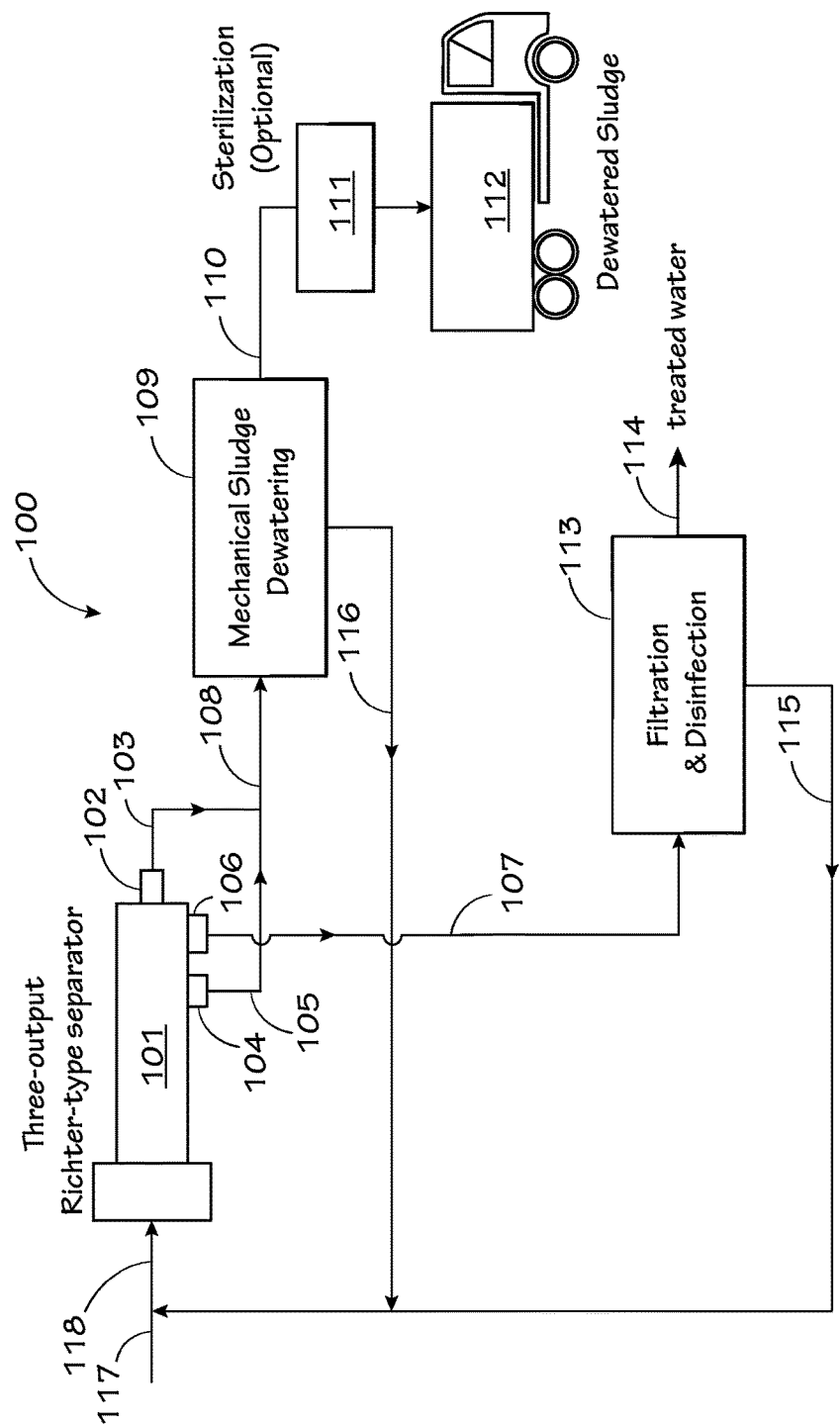
FIG. 2 illustrates a simplified block diagram of an improved municipal wastewater treatment system utilizing a three-output Richter-type separator and without any intermediary biological processes or sedimentation stages.

FIG. 2 illustrates a simplified block diagram of an improved municipal wastewater treatment system 100, as conceived by the inventor, utilizing a three-output Richter-type separator 101. The three-output Richter-type separator 101 includes three outputs that discharge a combination of water and solids according to the specific gravity of the solids. A first outlet port 102 discharges a lighter-than-water solids stream 103, a second outlet port 104 discharges a heavier-than-water solids stream 105, and a third outlet port 106 discharges a partially clarified water stream 107. The combination of the first outlet port 102 and the second outlet port 104 creates a combined stream 108. The combined stream 108 feed a mechanical sludge-dewatering stage 109 without any intermediary biological-process-based system and without sedimentation. The output of the mechanical sludge-dewatering stage 109 is dewatered sludge, often referred to as sludge cake 110. The sludge cake 110 can optionally be subjected to a sterilization stage 111. The finished sludge cake 112 can be disposed by hauling away to a landfill, reused, or incinerated.

The partially clarified water stream 107 is clarified sufficiently to feed a filtration and disinfection stage 113 without any intermediary biological-process or sedimentation. The treated water 114 resulting from the filtration and disinfection stage 113 can be either disposed or reused. As illustrated in FIG. 2, the filtration wastewater 115 can be combined with mechanical sludge dewatering wastewater 116 and the inlet wastewater 117 and feed into the Richter-type separator inlet 118.

In contrast to the conventional municipal wastewater treatment system 10 of FIG. 1, the improved municipal wastewater treatment system 100 of FIG. 2 does not require space and time consuming biological processes or sedimentation. This unexpected result and novel combination has the potential to significant reduce both construction, operational, and maintenance costs of municipal wastewater treatment operations. It is estimated that the facility footprint can advantageously be reduced to as small as 20% of a conventional municipal wastewater treatment facility.

Figure 3:
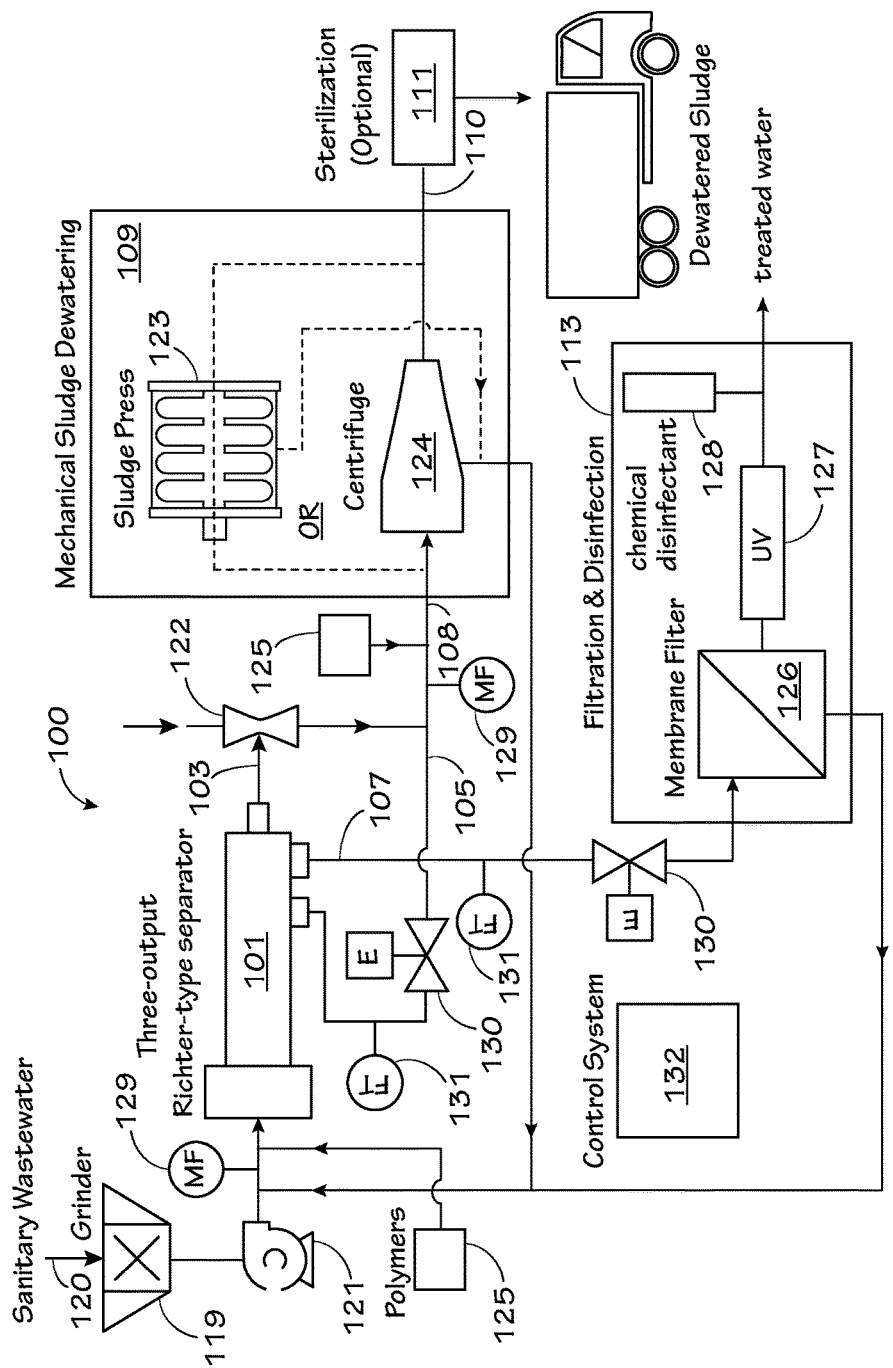
FIG. 3 illustrates a detailed block diagram of the improved municipal wastewater treatment system of FIG. 2.

Now, looking at the improved municipal wastewater treatment system 100 in more detail, we turn to FIG. 3 which illustrates a more detailed block diagram of the municipal wastewater treatment system of FIG. 2. Because biological processes and sedimentation are not required, it is not necessary to separately remove sand or grit. A grinder pump 119 can be used to reduce the size of gross particulates. The gross particulates along with the raw sanitary wastewater 120 sent to the three-output Richter-type separator 101. A feed pump 121 is placed between the grinder pump 119 and the three-output Richter-type separator 101 to control the rate of flow of wastewater to Richter-type separator.

As previously described, the combined stream 108 of the lighter-than-water solids stream 103 and the heavier-than-water solids stream 105 feeds the mechanical sludge-dewatering stage 109 without intermediary biological-process system and sedimentation. An optional eductor 122 can help facilitate the flow of lighter-than-water solids stream 103 into the heavier-than-water solids stream 105. In FIG. 3, the mechanical sludge-dewatering stage 109 can be either a sludge filter press 123 or a sludge-dewatering centrifuge 124. Other equivalents mechanical sludge dewatering equipment, such as belt filter presses, can be used. The resulting sludge cake 110 can optionally go through a sterilization stage 111 as previously describe. This sterilization stage 111 is typically some form of heat sterilization.

Polymers 125 can be optionally added to the inlet of the three-output Richter-type separator 101 to facilitate separation of suspended solids. Polymers 125 can also be optionally added to the inlet of the mechanical sludge-dewatering stage 109 to help facilitate dewatering of suspended solids. Polymers 125 coagulate suspended solids and produce large chains or curds of solid material know as floc that are easier to remove by centrifugal force.

Looking at the filtration and disinfection stage 113 in more detail, the partially clarified water stream 107 has a sufficiently low solids concentration to be directly filtered by a membrane filter 126 such as ultrafiltration or nanofiltration. Both ultrafiltration and nanofiltration are capable of filtering pathogens and suspended solids. In addition, nanofiltration can remove some of the valent ions. The membrane filter product water can be further treated by ultraviolet light 127 to remove the volatile BOD. Chemical disinfectant 128 such as chlorine and chloramines can be used to disinfectant the water.

The solids concentration can be controlled by varying the rate of flow to the three-output Richter-type separator 101, adjusting the speed of the impeller, or adjusting the ratio of the partially clarified water stream 107 to the feed water. A variable frequency drive (VFD) can be used to control the speed of the feed pump 121 and thereby the rate of flow to the three-output Richter-type separator. A VFD can also be used to control the speed of the motor of the three-output Richter-type separator 101. A control valve 130 can be used to control the ratio of partially clarified water stream to the input stream. Mass flow meters 129 dynamically measure the solids concentration at the input stream and the combined stream 108. Backpressure on the partially clarified water stream 107 and the heavier-than-water solids stream 105 can be adjusted by control valves 130 such as the electric control valves pictured. Other equivalent control valves can be used. Flow transmitters 131 measure the rate of heavier-than-water solids stream 105 and the partially clarified water stream 107. Flow transmitter can include, but are not limited to, magnetic flow meters, turbine flow meters, vortex flow meters, differential pressure flow meters, or paddle wheel flow meters. A control system 132 receives signals from the mass flow meters 129 and the flow transmitters 131 and adjusts the control valves 130 and VFDs according to a predetermined range of concentration ratios and output flows. The control signals between the control system 132 and the control valves 130 and the control system 132 and the VFDs can be analog, digital, wired, or wireless.

Figure 4:
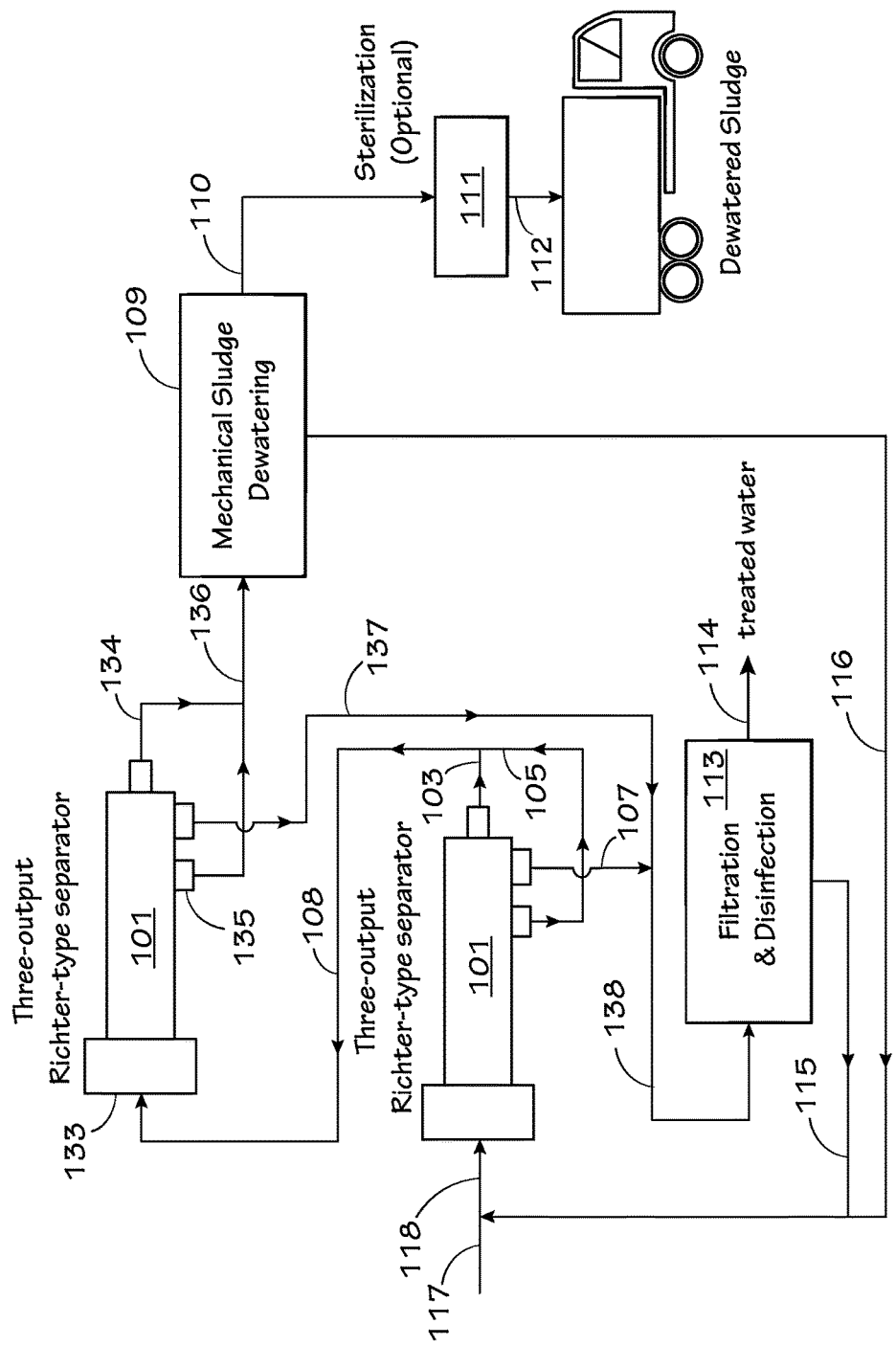
FIG. 4 illustrates a simplified block diagram of an improved municipal wastewater treatment system of the present disclosure utilizing two three-output Richter-type separators connected in series with the lighter-than-water solids stream and heavier-than-water solids stream of the first three-output Richter-type separator combined and feeding the input of the second Richter-type separator.

It may be desirable to gain a higher concentration of solids to feed the mechanical sludge-dewatering stage 109. FIG. 4 illustrates an embodiment of the present disclosure that can obtain higher solids concentrations feeding the mechanical sludge-dewatering stage 109 then the improved municipal wastewater treatment system 100 of FIGS. 2-3. In FIG. 4, this is achieved by connecting two of the three-output Richter-type separators 101 connected in series with the lighter-than-water solids stream 103 and heavier-than-water solids stream 105 of the first of the three-output Richter-type separators 101 form a combined stream 108 and feed the inlet 133 of the second of the three-output Richter-type separators 101. The second Richter-type separator lighter-than-water solids stream 134 and the second Richter-type separator heavier-than-water solids stream 135 form a second combined stream 136 and feed the mechanical sludge-dewatering stage 109. The sludge cake 110 that result from the output of the mechanical sludge-dewatering stage 109 can be optionally be subjected to a sterilization stage 111. The finished sludge cakes 112 can be disposed by hauling away to a landfill, reused, or incinerated as previously described.

The partially clarified water stream 107 of the first of the three-output Richter-type separators 101 is combined with a second partially clarified water stream 137 of the second of the three-output Richter-type separators forming a combined partially clarified water stream 138. The combined partially clarified water stream 138 feeds the filtration and disinfection stage 113 without any biological intermediary processes or sedimentation. The treated water 114 resulting from the filtration and disinfection stage 113 can be either disposed or reused. The filtration wastewater 115 is combined with mechanical sludge dewatering wastewater 116 and the inlet wastewater 117 and feed into the Richter-type separator inlet 118.

Figure 5:
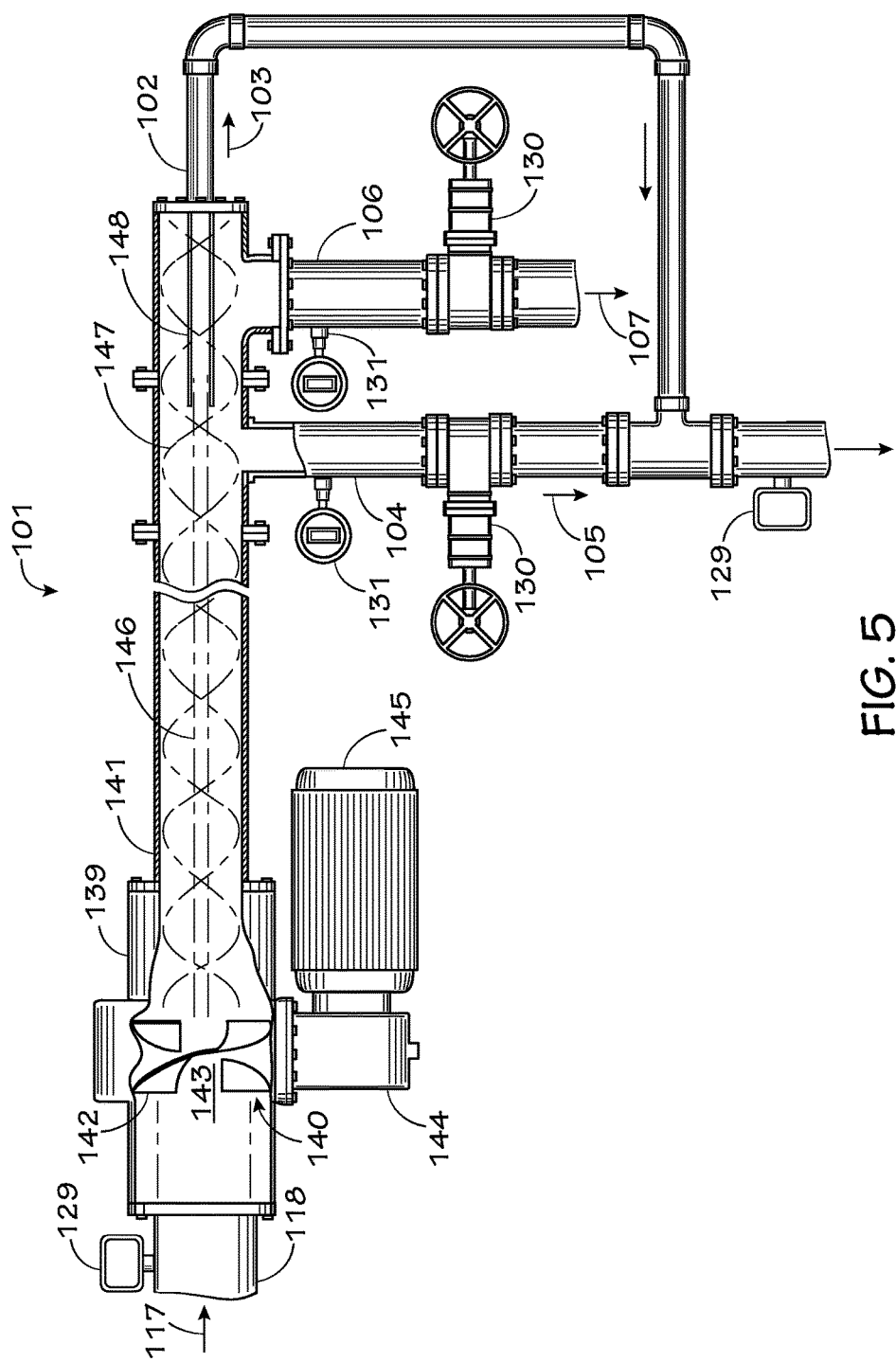
FIG. 5 illustrates a three-output Richter-type separator of the present disclosure, in partial cutaway front elevation view, with the lighter-than-water and heavier-than-water solids output combined.
Figure 6:
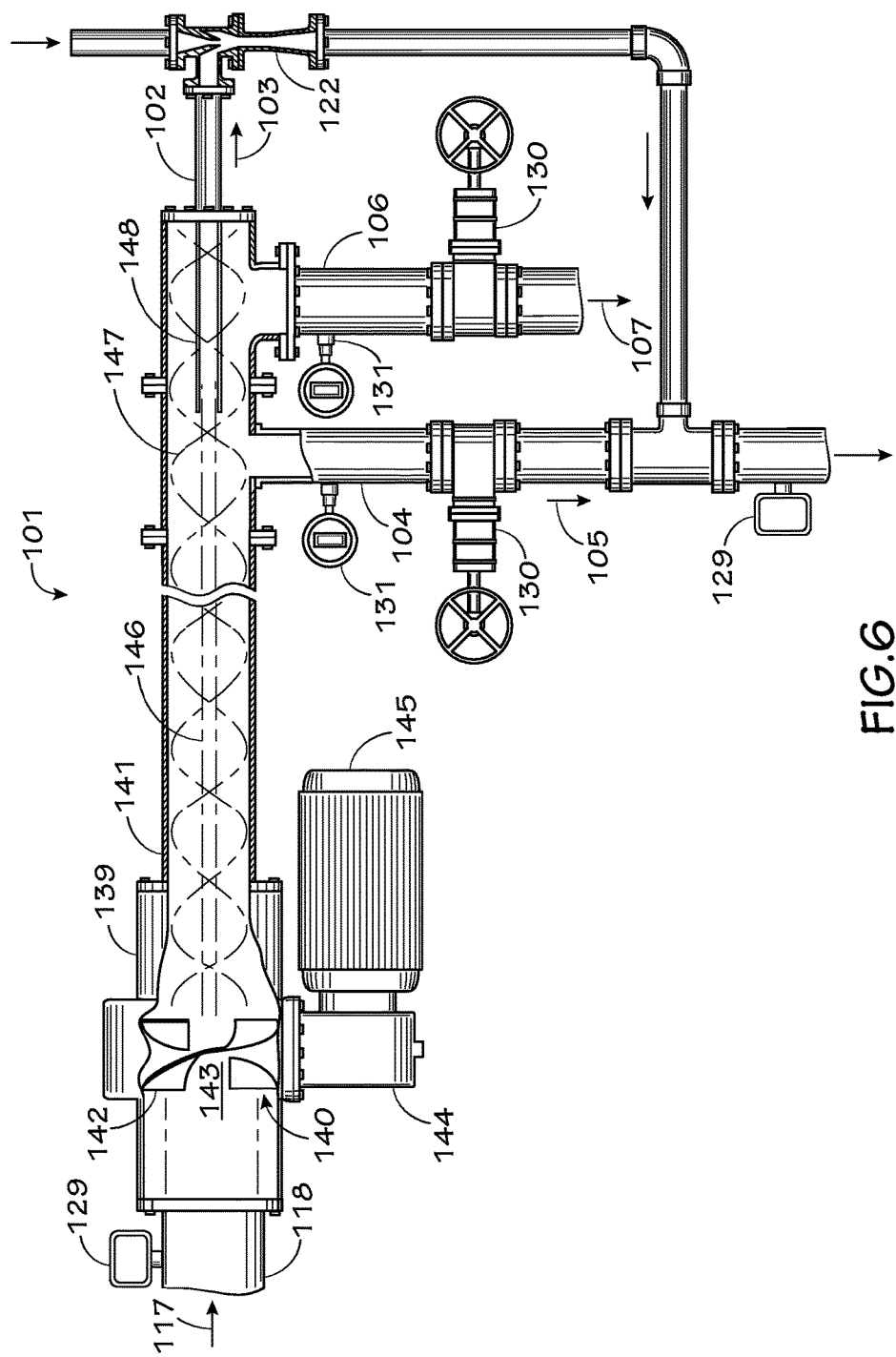
FIG. 6 illustrates a three-output Richter-type separator of the present disclosure, in partial cutaway front elevation view, with the lighter-than-water and heavier-than-water solids output combined and aided by an eductor.

FIGS. 5-6 illustrates a three-output Richter-type separator 101 of the present disclosure, in partial cutaway front elevation view. In FIG. 5, the first outlet port 102 and second outlet port 104 directly tied together. In FIG. 6 the flow of lighter-than-water solids stream 103 into the heavier-than-water solids stream 105 is aided by the optional eductor 122. Other than that, both FIGS. 5 and 6 are identical and both illustrate possible physical positions of the mass flow meters 129, flow transmitters 131, and control valves 130.

Referring to both FIGS. 5 and 6, the inlet wastewater 117 enters the Richter-type separator inlet 118. The Richter-type separator inlet 118 is illustrated as being inwardly co-axial to the axial-type pump housing 139. The three-output Richter-type separator 101 includes an impeller 140 and a body 141 extending longitudinally downstream from the impeller 140. The impeller 140 includes two or more helical blades 142 having decreasing axial pitch in a direction of fluid flow and defining a hollow core 143 that passes fluid and occupies a central axis of the impeller 140.

Because the impeller 140 has a hollow core 143, there is no central shaft to drive the impeller 140. In FIGS. 5-6, the impeller 140 is rigidly attached to a rotating drum surrounding the outer circumference of the impeller 140. The rotating drum is not shown but hidden beneath the drum housing 144. The drum, in turn is driven by a motor 145. The motor 145 illustrated is electric, however, the motor 145 can also be a hydraulic motor or water-driven motor.

As the inlet wastewater 117 passes through the hollow core 143 and the helical blades 142 of the impeller 140, a low-pressure area 146 in the center of the line of flow is initiated from the hollow core 143 with the lighter-than-water specific solids constituents. A higher velocity flow 147 tends toward the perimeter of the body 141. The higher velocity flow 147 includes water and heavier-than-water specific gravity constituents. The heavier-than-water constituents will discharge from the body 141 through the second outlet port 104. The third outlet port 106 will discharge the partially clarified water stream 107. The partially clarified water stream 107 can include dissolved and suspended solids with a specific gravity of one.

The lighter-than-water solids constituent flowing in the low-pressure area 146 is discharged through a hollow tube 148, forming the first outlet port 102. The hollow tube 148 is axial to the hollow core 143, inwardly co-axial to the body 141, extending longitudinally into the body 141, and positioned against the end of the body 141 distal to the impeller.

Figure 7:
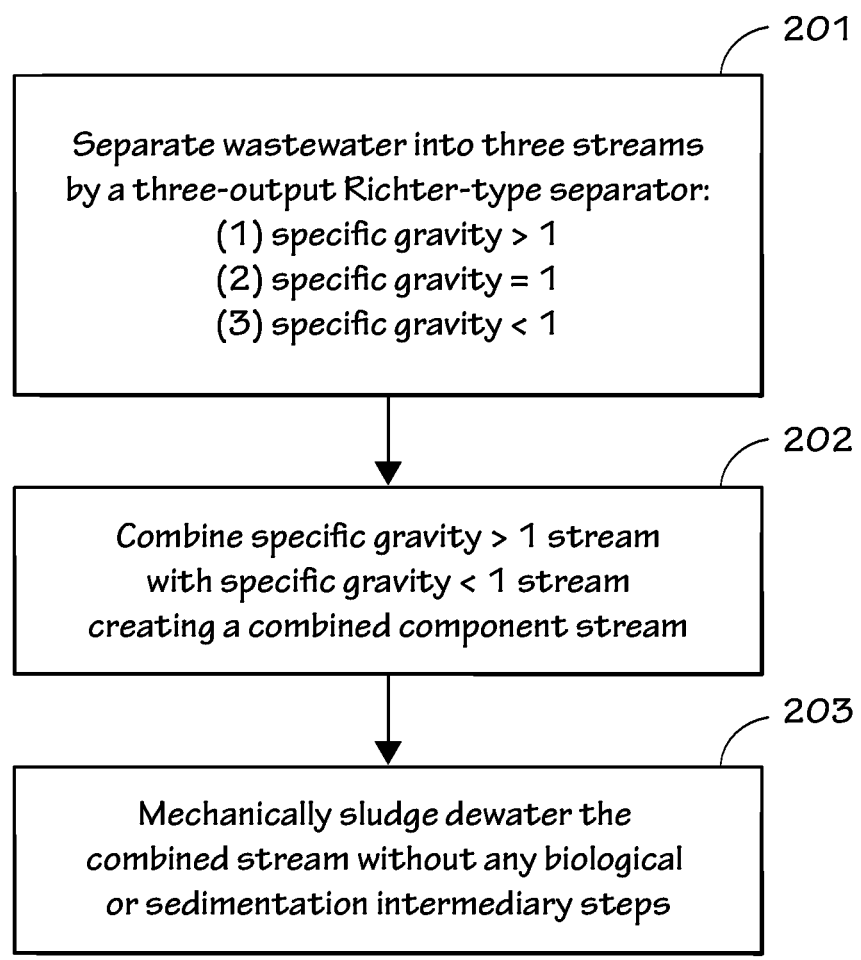
FIG. 7 illustrates a simplified flow diagram of the present disclosure showing solids handling without any biological intermediately steps.

FIG. 7 illustrates a simplified flow diagram of the present disclosure showing solids handling. In step 201, the municipal or sanitary wastewater is separated into three streams by a three-output Richter-type separator, according to specific gravity: a lighter-than-water solids stream, a heavier-than-water solids stream, and a water stream. In step 202, the lighter-than-water solids stream, and the heavier-than-water solids stream are combined, creating a combined component stream. In step 203, the combined component stream is mechanically sludge dewatered without any biological or sedimentation intermediary steps.

Figure 8:
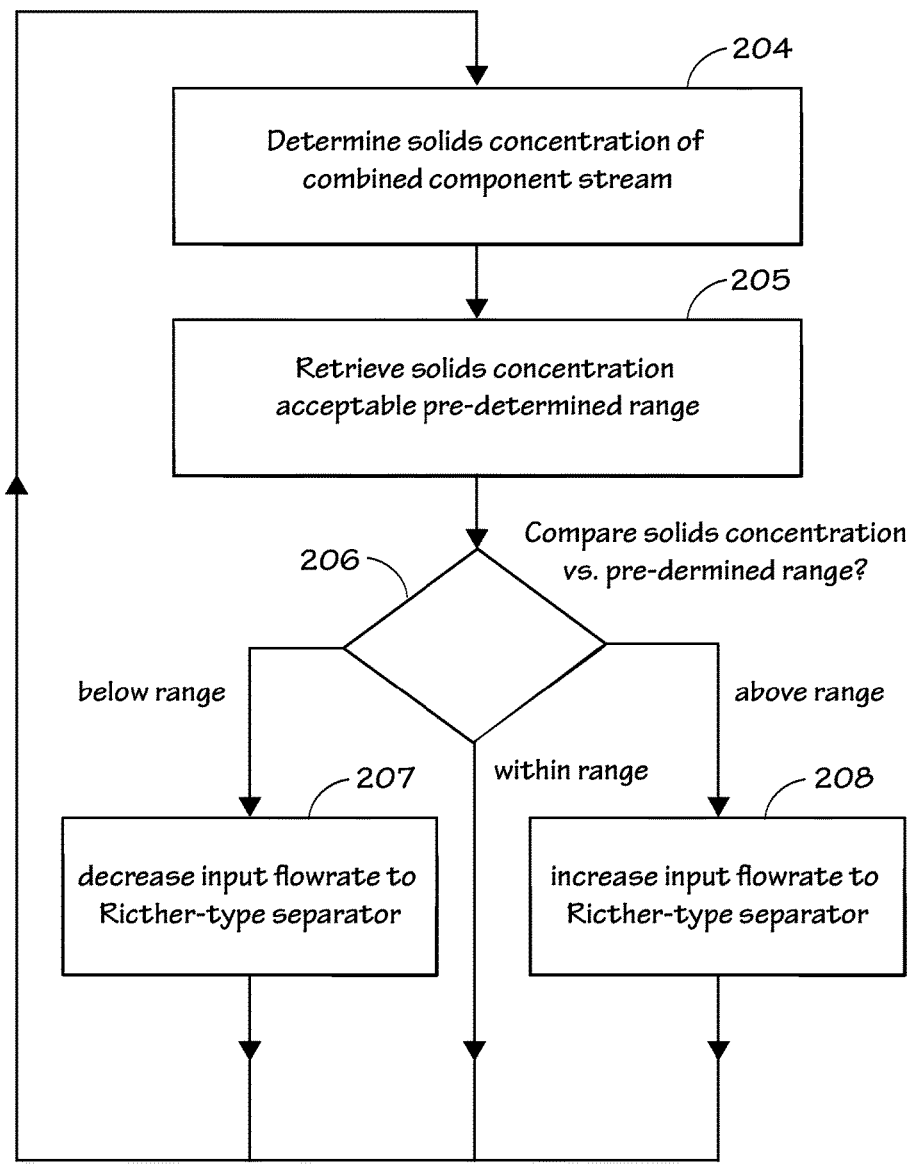
FIG. 8 illustrates a simplified flow diagram of the present disclosure showing adjusting the solids concentration by adjusting the flow of the input stream to the three-output Richter-type separator.

FIG. 8 illustrates a simplified flow diagram of the present disclosure showing adjusting the solids concentration by adjusting the flow of the input stream to the three-output Richter-type separator. In step 204, the solids concentration of the combined component stream is determined. Referring to FIGS. 3 and 8, the solids concentration is calculated by the control system 132 using the mass flow meter 129. In step 205, the control system retrieves a predetermined range of acceptable solids concentration levels from memory. This could alternatively be a predetermined solids ratio determined by measuring the mass flow using the mass flow meter 129 positioned at the Richter-type separator inlet 118 and at the mechanical sludge-dewatering stage 109. In step 206, the calculated solids concentration from the mass flow meter measurement is compared with the predetermined range retrieved from memory. In step 207, if the solids concentration is below range, decrease the flowrate to the three-output Richter-type separator 101. If the solids concentration is above range, in step 208, increase the flowrate to the three-output Richter-type separator 101. If the solid concentration is within range, do not adjust the flowrate. The process loops back to the beginning.

Figure 9:
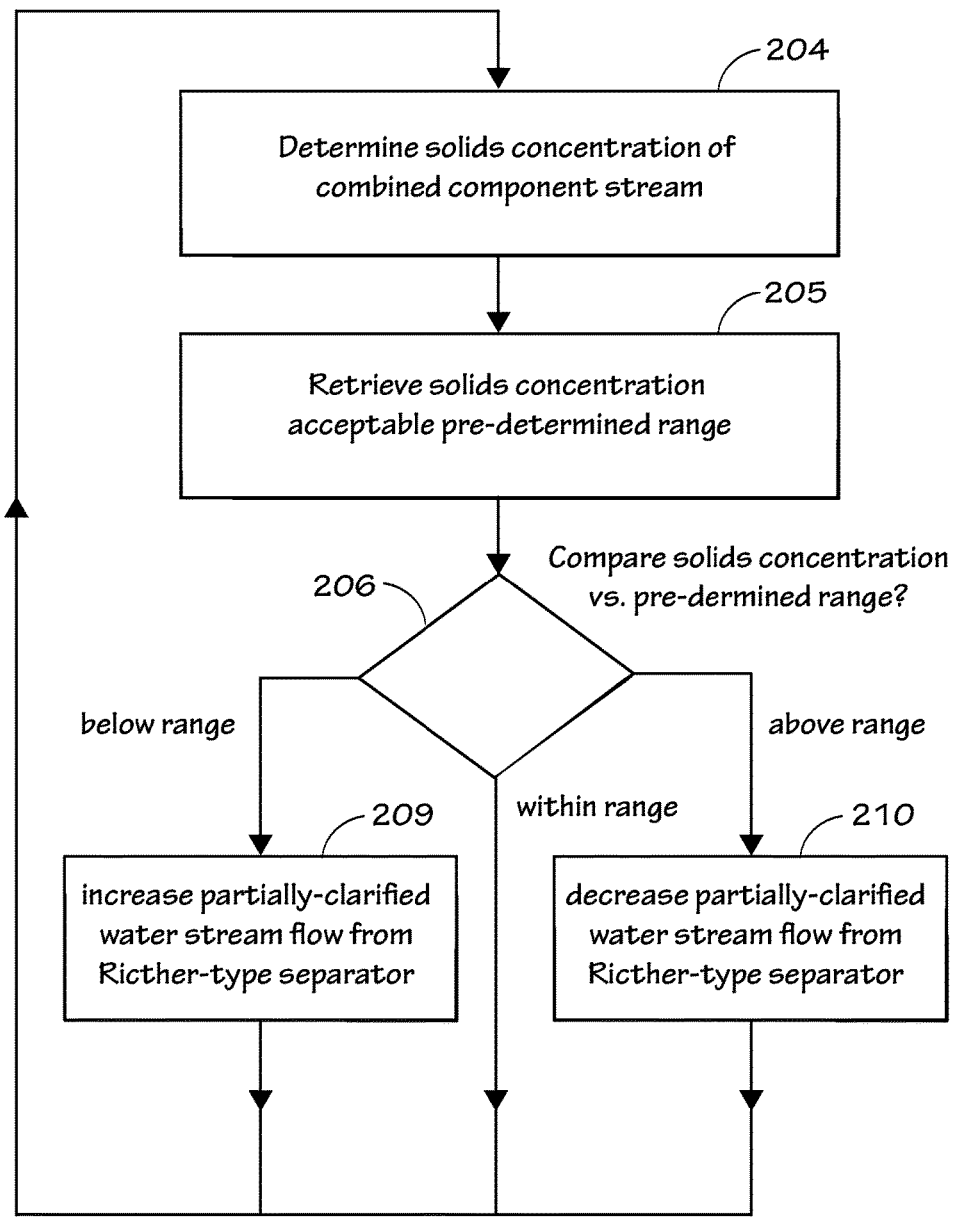
FIG. 9 illustrates a simplified flow diagram of the present disclosure showing adjusting the solids concentration by adjusting the flow of the partially clarified water stream.

FIG. 9 illustrates a simplified flow diagram of the present disclosure showing adjusting the solids concentration by adjusting the flow of the partially clarified water stream. Referring to FIGS. 3 and 9, in step 204, the solids concentration of the combined component stream is determined. Referring to FIGS. 3 and 8, the solids concentration is calculated by the control system 132 using the mass flow meter 129. In step 205, the control system retrieves a predetermined range of acceptable solids concentration levels from memory. This could alternatively be a predetermined solids ratio determined by measuring the mass flow using the mass flow meter 129 positioned at the Richter-type separator inlet 118 and at the mechanical sludge-dewatering stage 109. In step 206, the calculated solids concentration from the mass flow meter measurement is compared with the predetermined range retrieved from memory. In step 209, if the solids concentration determined in step 204 is below the expected range from step 205, then the flow of the partially clarified water stream 107 flowing from the third outlet port 106 is increased by sending a signal from the control system 132 to further open the control valve 130 associated with the third outlet port 106. In step 210, if the solids concentration determined in step 204 is above the expected range from step 205, then the flow of the partially clarified water stream 107 flowing from the third outlet port 106 is decreased by sending a signal from the control system 132 to further close the control valve 130 associated with the third outlet port 106.

Figure 10:
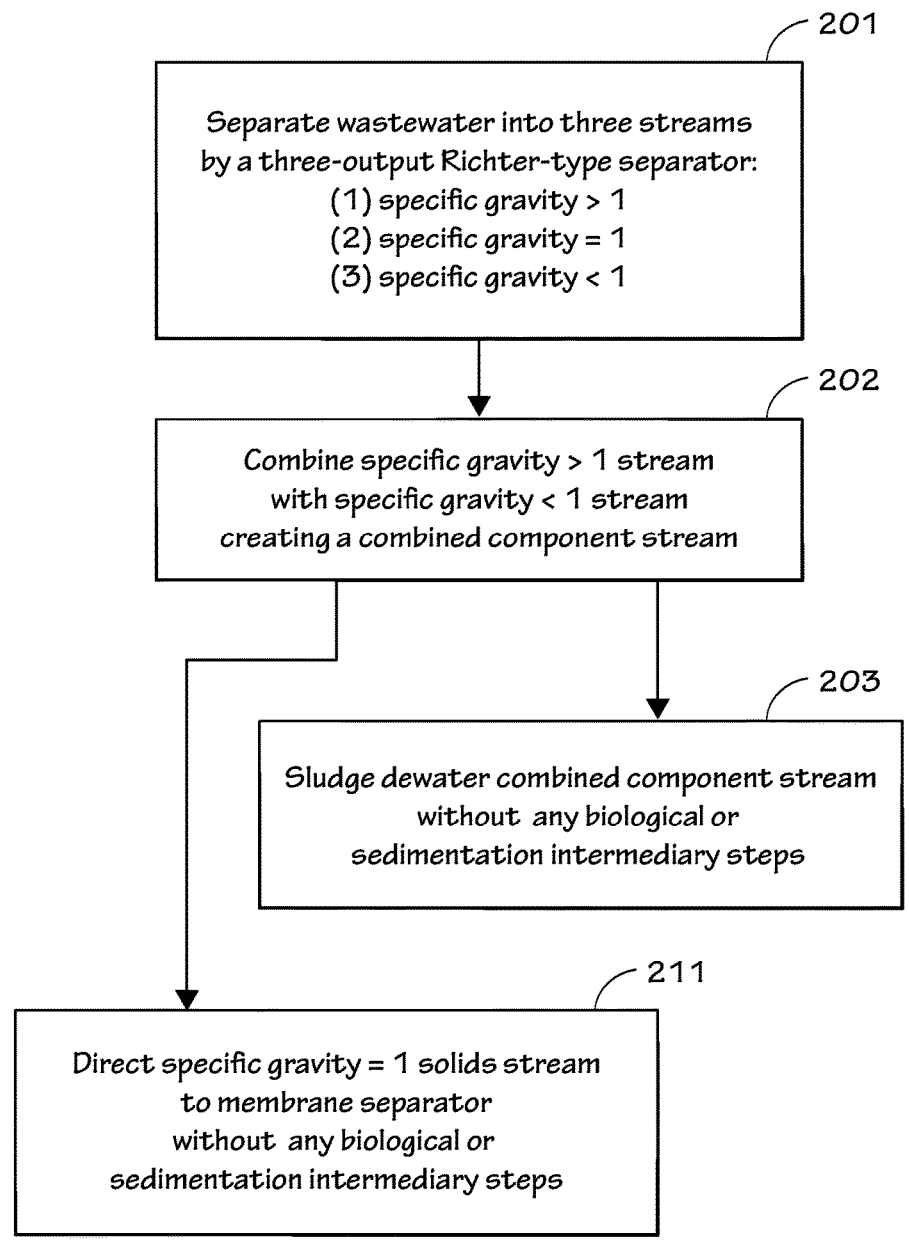
FIG. 10 illustrates a simplified flow diagram of the present disclosure illustrating the water purification process without any intermediately biological process or sedimentation steps.

FIG. 10 illustrates a simplified flow diagram of the present disclosure illustrating the water purification process without any biological and sedimentation intermediately steps. Referring to FIGS. 3 and 10, in step 201, the municipal or sanitary wastewater is separated into three streams by a three-output Richter-type separator 101, according to specific gravity: a lighter-than-water solids stream 103, a heavier-than-water solids stream 105, and a partially clarified water stream 107. In step 202, the lighter-than-water solids stream 103, and the heavier-than-water solids stream are combined, creating a combined stream 108. In step 211, filter the partially clarified water stream 107 with a membrane filter without any biological or sedimentation intermediary steps. In step 203, the combined component stream is mechanically sludge dewatered without any biological or sedimentation intermediary steps.

A system and method for treating sanitary and municipal wastewater has been described. It is not the intent of this disclosure to limit the claimed invention to the examples, variations, and exemplary embodiments described in the specification. Those skilled in the art will recognize that variations will occur when embodying the claimed invention in specific implementations and environments. For example, it is possible to implement certain features described in separate embodiments in combination within a single embodiment. Similarly, it is possible to implement certain features described in single embodiments either separately or in combination in multiple embodiments. It is the intent of the inventor that these variations fall within the scope of the claimed invention. While the examples, exemplary embodiments, and variations are helpful to those skilled in the art in understanding the claimed invention, it should be understood that, the scope of the claimed invention is defined solely by the following claims and their equivalents.

What is claimed is:

1. A system for treating sanitary wastewater, comprising:
a three-output Richter-type separator including a first outlet port discharging a lighter-than-water solids stream, a second outlet port discharging a heavier-than-water solids stream, and a third outlet port discharging a partially clarified water stream;
a mechanical sludge-dewatering device; and
the lighter-than-water solids stream and the heavier-than-water solids stream, in combination, feed the mechanical sludge-dewatering device without any intermediary biological-process systems and without sedimentation devices.

2. The system of claim 1, further including:
a membrane filter;
the partially clarified water stream feeds the membrane filter without any intermediary biological-process systems and without sedimentation devices.

3. The system of claim 2, wherein:
the three-output Richter-type separator includes an inlet;
the membrane filter discharges a filtration wastewater; and
the filtration wastewater feeds into the inlet.

4. The system of claim 1, wherein:
the three-output Richter-type separator includes an inlet;
the mechanical sludge-dewatering device includes a discharge of a mechanical sludge-dewatering wastewater; and
the mechanical sludge-dewatering wastewater feeds into the inlet.

5. The system of claim 1, further comprising:
the three-output Richter-type separator is a first three-output Richter-type separator and a second three-output Richter-type separator;
the first outlet port is a second three-output Richter-type separator first outlet port;
the second outlet port is a second three-output Richer-type separator second outlet port; and
a first three-output Richter-type separator lighter-than-water solids stream and a first three-output Richter-type separator heavier-than-water solids stream, in combination, feed a second three-output Richter-type separator inlet.

6. The system of claim 1, further comprising:
a controller configured to dynamically adjust a rate of municipal wastewater flowing into the three-output Richter-type separator in order to adjust solids concentration of the lighter-than-water solids stream and the heavier-than-water solids stream, in combination into a preset range.

7. The system of claim 1, further comprising:
a controller configured to dynamically adjust a rate of flow of the partially clarified water stream discharged out of the three-output Richter-type separator in order to adjust solids concentration of the lighter-than-water solids stream and the heavier-than-water solids stream, in combination into a preset range.

8. A system for treating sanitary wastewater, comprising:
a three-output Richter-type separator including a first outlet port discharging a lighter-than-water solids stream, a second outlet port discharging a heavier-than-water solids stream, and a third outlet port discharging a partially clarified water stream;
a mechanical sludge-dewatering device;
the lighter-than-water solids stream and the heavier-than-water solids stream in combination creates a combined stream that feeds the mechanical sludge-dewatering device; and
the combined stream having solids concentration capable of directly feeding the mechanical sludge-dewatering device.

9. The system of claim 8, further including a membrane filter receiving the partially clarified water stream.

10. The system of claim 9, wherein:
the three-output Richter-type separator includes an inlet;
the membrane filter discharges a filtration wastewater; and
the filtration wastewater feeds into the inlet.

11. The system of claim 8, wherein:
the three-output Richter-type separator includes an inlet;
the mechanical sludge-dewatering device includes a discharge of a mechanical sludge-dewatering wastewater; and
the mechanical sludge-dewatering wastewater feeds into the inlet.

12. A method for treating sanitary wastewater, comprising:
combining a lighter-than-water solids stream and a heavier-than-water solids stream from corresponding first and second outlet ports of a three-output Richter-type separator, creating a combined stream; and
sludge-dewatering the combined stream using a mechanical sludge-dewatering device without intermediary biological processes and without sedimentation.

13. The method of claim 12, further comprising:
processing a partially clarified water stream discharged from the three-output Richter-type separator through a membrane filter without any intermediary biological processes and without sedimentation.

14. The method of claim 12, further comprising:
adding polymers to an inlet of the three-output Richter-type separator to facilitate discharge of suspended solids.

15. The method of claim 12, further comprising:
determining a solids concentration of the combined stream;
retrieve a solids concentration predetermined range; and
dynamically change an input flow rate to the three-output Richter-type separator based on comparing the solids concentration of the combined stream and the solids concentration predetermined range.

16. The method of claim 12, further comprising:
determining a solids concentration of the combined stream;
retrieve a solids concentration predetermined range; and
dynamically change a flow rate of a partially clarified water stream discharged from the three-output Richter-type separator, based on comparing the solids concentration of the combined stream and the solids concentration predetermined range.

17. A method for treating sanitary wastewater, comprising:
creating a combined stream by combining a lighter-than-water solids stream and a heavier-than-water solids stream from corresponding first and second outlets of a three-output Richter-type separator; and
sludge-dewatering the combined stream using a mechanical sludge-dewatering device, the combined stream having a solids concentration capable of directing feeding the mechanical sludge-dewatering device.

18. The method of claim 17, further comprising:
processing a partially clarified water stream discharged from the three-output Richter-type separator through a membrane filter.

19. The method of claim 17, further comprising:
adding polymers to an inlet of the three-output Richter-type separator to facilitate discharge of suspended solids.

20. The method of claim 17, further comprising:
determining the solids concentration of the combined stream;
retrieve a solids concentration predetermined range; and
dynamically change an input flow rate to the three-output Richter-type separator based on comparing the solids concentration of the combined stream and the solids concentration predetermined range.

21. The method of claim 17, further comprising:
determining the solids concentration of the combined stream;
retrieve a solids concentration predetermined range; and
dynamically change a flow rate of a partially clarified water stream discharged from the three-output Richter-type separator, based on comparing the solids concentration of the combined stream and the solids concentration predetermined range.

* * * * *